E. B. HILL.
SASH-HOLDER.
No. 181,339.  Patented Aug. 22, 1876.
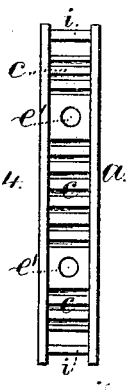
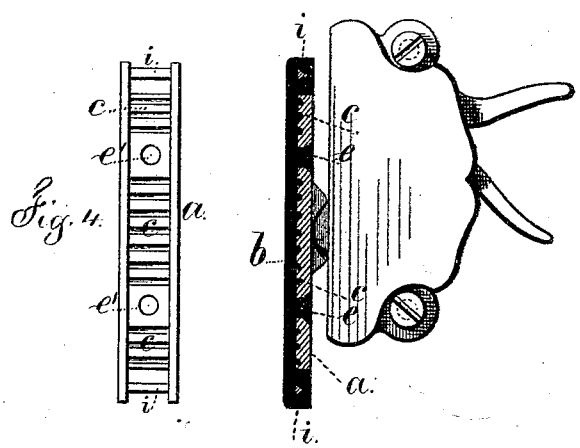
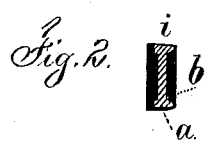
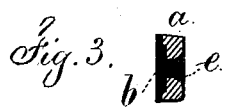
Witnesses,
Cho. H. Smith
Harold Serrell
Inventor
Edward B. Hill.
per Lemuel W. Serrell
atty.

UNITED STATES PATENT OFFICE.

EDWARD B. HILL, OF NEW HAVEN, CONNECTICUT, ASSIGNOR TO HEZEKIAH BRADFORD AND HERMAN HAMBURGER, OF PHILADELPHIA, PA.

IMPROVEMENT IN SASH-HOLDERS.

Specification forming part of Letters Patent No. 181,339, dated August 22, 1876; application filed January 10, 1876.

*To all whom it may concern:*

Be it known that I, EDWARD B. HILL, of New Haven, in the State of Connecticut, have invented an Improvement in Friction-Clamps for Sash-Supporters, of which the following is a specification:

Various articles have been made with india-rubber surfaces upon a metal base or foundation, the india-rubber being applied thereto in a plastic state and afterward vulcanized, in order that the rubber may remain in its position. Sash supporters or holders have been made with a pressure-plate faced with india-rubber, as in Letters Patent No. 160,735 to J. B. Wilford, March 9, 1875. Difficulty has been experienced in securing the rubber so firmly that the frictional contact and sliding movement will not separate the rubber from the metal.

My improvement is for securing the rubber surface to the pressure-plate in such a manner that the rubber cannot be separated by use.

In the drawing, Figure 1 is an elevation of a sash-holder, with the pressure-plate in section longitudinally. Figs. 2 and 3 are transverse sections of such pressure-plate; and Fig. 4 is a view of the face of the pressure-plate.

The plate $a$ is of suitable size and shape, the surface of rubber $b$, or equivalent elastic material, is applied to the same. The surface of $a$ is preferably roughened, as seen at $c$, and to hold the rubber still more firmly there are holes $e'$ in the pressure-plate, enlarged or countersunk at the back, into which the rubber is pressed and retained while being vulcanized, and forms the tie-studs $e\ e$ that are more or less numerous. At the ends of the clamps the most difficulty in holding the rubber has occurred. I provide the cross-bars $i$ between the side portions of the pressure-plate, and mold the rubber or other material around such cross-bars, so that it becomes practically impossible to peel the rubber off the pressure-plate at the ends thereof. These bars may be introduced at other places in the pressure-plate, running longitudinally or transversely of the same, and contained within mortises or recesses in such pressure-plate. The sash-supporter with this pressure-plate serves to prevent the sash rattling, and it may be used upon sashes that are provided with the ordinary friction-springs upon the edges.

The devices for holding and moving the pressure-plate are neither described nor claimed, as they are similar to those in Letters Patent 160,735, before referred to.

I claim as my invention—

The cross-bar $i$, and opening or recess in the pressure-plate of the friction-clamp, around which bar the india-rubber, or similar material, composing the face of the clamp, is passed and held by such bar, substantially as and for the purposes set forth.

Signed by me this 7th day of December, A. D. 1875.

EDWARD B. HILL.

Witnesses:
GEO. T. PINCKNEY,
CHAS. H. SMITH.